(12) United States Patent
Barger et al.

(10) Patent No.: US 11,222,277 B2
(45) Date of Patent: Jan. 11, 2022

(54) ENHANCING ROBUSTNESS OF PSEUDO-RELEVANCE FEEDBACK MODELS USING QUERY DRIFT MINIMIZATION

(71) Applicant: International Business Machines Corporation, Armonk, NY (US)

(72) Inventors: Artem Barger, Haifa (IL); Roy Levin, Yakov (IL); Haggai Roitman, Yoknea'm Elit (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 584 days.

(21) Appl. No.: 15/010,141

(22) Filed: Jan. 29, 2016

(65) Prior Publication Data

US 2017/0220945 A1    Aug. 3, 2017

(51) Int. Cl.
*G06N 7/00* (2006.01)
*G06F 16/2457* (2019.01)
*G06N 20/00* (2019.01)

(52) U.S. Cl.
CPC ....... *G06N 7/005* (2013.01); *G06F 16/24578* (2019.01); *G06N 20/00* (2019.01)

(58) Field of Classification Search
CPC ........ G06N 99/005; G06N 5/02; G06N 7/005; G06N 20/00; G06Q 10/10; G06Q 30/02; B82Y 10/00; G06F 16/24578
See application file for complete search history.

(56) References Cited

U.S. PATENT DOCUMENTS

2009/0198672 A1 * 8/2009 Jones ................ G06F 17/30672

OTHER PUBLICATIONS

Query-Drift Prevention for Robust Query Expansion—2008 Liron Zighelnic and Oren Kurland—Faculty of Industrial Engineering and Management Technion—Israel institute of technology Technion City, Haifa 32000 Israel—zliron@tx.technion.ac.il, kurland@ie.technion.ac.il.*

Two are better than one! Re-ranking search results using an additional retrieved list Lior Meister, Oren Kurland, and Inna Gelfer Kalmanovich—Faculty of Industrial Engineering and Management Technion—Israel Institute of Technology—meister@tx.technion.ac.il,kurland@ie.technion.ac.il,innagel@tx.technion.ac.il.*

(Continued)

*Primary Examiner* — Kakali Chaki
*Assistant Examiner* — Ababacar Seck
(74) *Attorney, Agent, or Firm* — Cantor Colburn LLP; Joseph Petrokaitis

(57) ABSTRACT

A pseudo-relevance feedback (PRF) system is disclosed that determines an optimized relevance model for a search query by utilizing a posterior relevance model to estimate the likelihood that an initial set of top-K retrieved documents would be retrieved given the posterior relevance model, re-ranking the top-K documents based on their respective estimates of likelihood of retrieval, determining a rank similarity between the initial ranking of the top-K documents and the re-ranking of the top-K documents, updating one or more model parameters of the posterior relevance model based on the rank similarity, and iteratively performing the above process until the rank similarity is maximized, at which point, the optimized relevance model is obtained.

18 Claims, 4 Drawing Sheets

(56) References Cited

OTHER PUBLICATIONS

Improving Pseudo-Relevance Feedback: "Multiple Paths, Same Goal"—2010 by Karthik Raman.*
Query-Drift Prevention for Robust Query Expansion—2008Liron Zighelnic and Oren Kurland—Faculty of Industrial Engineering and Management Technion—Israel institute of technology Technion City, Haifa 32000 Israel—zliron@tx.technion.ac.il, kurland@ie.technion.ac.il (Year: 2008).*
Two are better than one! Re-ranking search results using an additional retrieved listLior Meister, Oren Kurland, and Inna Gelfer Kalmanovich (Year: 2009).*
Improving Pseudo-Relevance Feedback: "Multiple Paths, Same Goal"—2010 by Karthik Raman (Year: 2010).*
Samuel N. Kramer, "The Oldest Literary Catalogue: A Sumerian List of Literary Compositions Compiled about 2000 B.C.," 88 Bulletin of the American Schools of Oriental Research 10 (Dec. 1942).*
Rohit Sharma, Information Retrieval System Explained: Types, Comparison & Components.*
Hsiao et al., "A Novel Language-Model-Based Approach for Image Object Mining and Re-Ranking", 2008 Eighth IEEE International Conference on Data Mining, 2008, pp. 1-10.
Li, Xiaoyan, "A new robust relevance model in the language model framework", Information Processing and Management, 2007, pp. 1-17.

* cited by examiner

ENHANCING ROBUSTNESS OF PSEUDO-RELEVANCE FEEDBACK MODELS USING QUERY DRIFT MINIMIZATION

BACKGROUND

Relevance feedback is a feature of some information retrieval (IR) systems. Relevance feedback generally includes using the relevance of search results that are initially returned for a given query to perform a new query. Three main types of feedback may be utilized: explicit feedback, implicit feedback, and pseudo feedback.

Explicit user feedback may include, for example, an explicit indication of the relevance of a document retrieved for a query. Explicit feedback may be provided using a binary system (e.g., relevant or not relevant) or a graded system that allows for a more granular assessment of relevance. Graded relevance may also include a user-provided cardinal ordering of retrieved documents. Implicit feedback may be feedback that, while not provided explicitly by a user, can be inferred from a user's behavior. Implicit feedback may include, for example, whether a retrieved document is selected for viewing (e.g., click-through data), the duration of time spending viewing a document, page browsing or scrolling actions, etc.

Pseudo-relevance feedback (PRF) is an IR technique that may be used to improve to the relevance of documents retrieved in response to a search query in the absence of explicit user feedback or implicit user feedback. The relevance of retrieved documents may be improved through expansion of the initial query (e.g., adding additional terms to the query), re-ranking the initial list of retrieved documents, fusion of information contain in positive (e.g., relevant) and negative (e.g., non-relevant) retrieved documents, or the like. Generally, a PRF technique involves selecting some subset of the initial results returned by an initial query as the relevant results, performing a query expansion using terms contained in the selected relevant results, and ultimately returning the most relevant results. Conventional PRF techniques suffer from a number of drawbacks. Technical solutions that address at least some of the drawbacks associated with conventional PRF techniques are described herein.

SUMMARY

In one or more example embodiments of the disclosure, a method is disclosed that includes determining, by a computer processor, a set of search results returned for a search query, wherein the set of search results is ranked in accordance with a first ranking; determining, by the computer processor, a first relevance model; determining, by the computer processor and based at least in part on the first relevance model, a respective probability of retrieval of each search result in the set of search results; determining, by the computer processor, a second ranking for the set of search results based at least in part on the respective probability of retrieval of each result in the set of search results; determining, by the computer processor, a rank similarity between the first ranking and the second ranking; determining, by the computer processor, a second relevance model by updating at least one model parameter of the first relevance model based at least in part on the rank similarity; determining, by the computer processor, that the second relevance model is an optimized relevance model for the search query based at least in part on the rank similarity.

In one or more other example embodiments of the disclosure, a system is disclosed that includes at least one memory storing computer-executable instructions; and at least one processor configured to access the at least one memory and execute the computer-executable instructions to: determine a set of search results returned for a search query, wherein the set of search results is ranked in accordance with a first ranking; determine a first relevance model; determine, based at least in part on the first relevance model, a respective probability of retrieval of each search result in the set of search results; determine a second ranking for the set of search results based at least in part on the respective probability of retrieval of each result in the set of search results; determine rank similarity between the first ranking and the second ranking; determine a second relevance model by updating at least one model parameter of the first relevance model based at least in part on the rank similarity; determine that the second relevance model is an optimized relevance model for the search query based at least in part on the rank similarity.

In one or more other example embodiments of the disclosure, a computer program product is disclosed that comprises a non-transitory storage medium readable by a processing circuit, the storage medium storing instructions executable by the processing circuit to cause a method to be performed, the method comprising: determining a set of search results returned for a search query, wherein the set of search results is ranked in accordance with a first ranking; determining a first relevance model; determining, based at least in part on the first relevance model, a respective probability of retrieval of each search result in the set of search results; determining a second ranking for the set of search results based at least in part on the respective probability of retrieval of each result in the set of search results; determining a rank similarity between the first ranking and the second ranking; determining a second relevance model by updating at least one model parameter of the first relevance model based at least in part on the rank similarity; determining that the second relevance model is an optimized relevance model for the search query based at least in part on the rank similarity.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
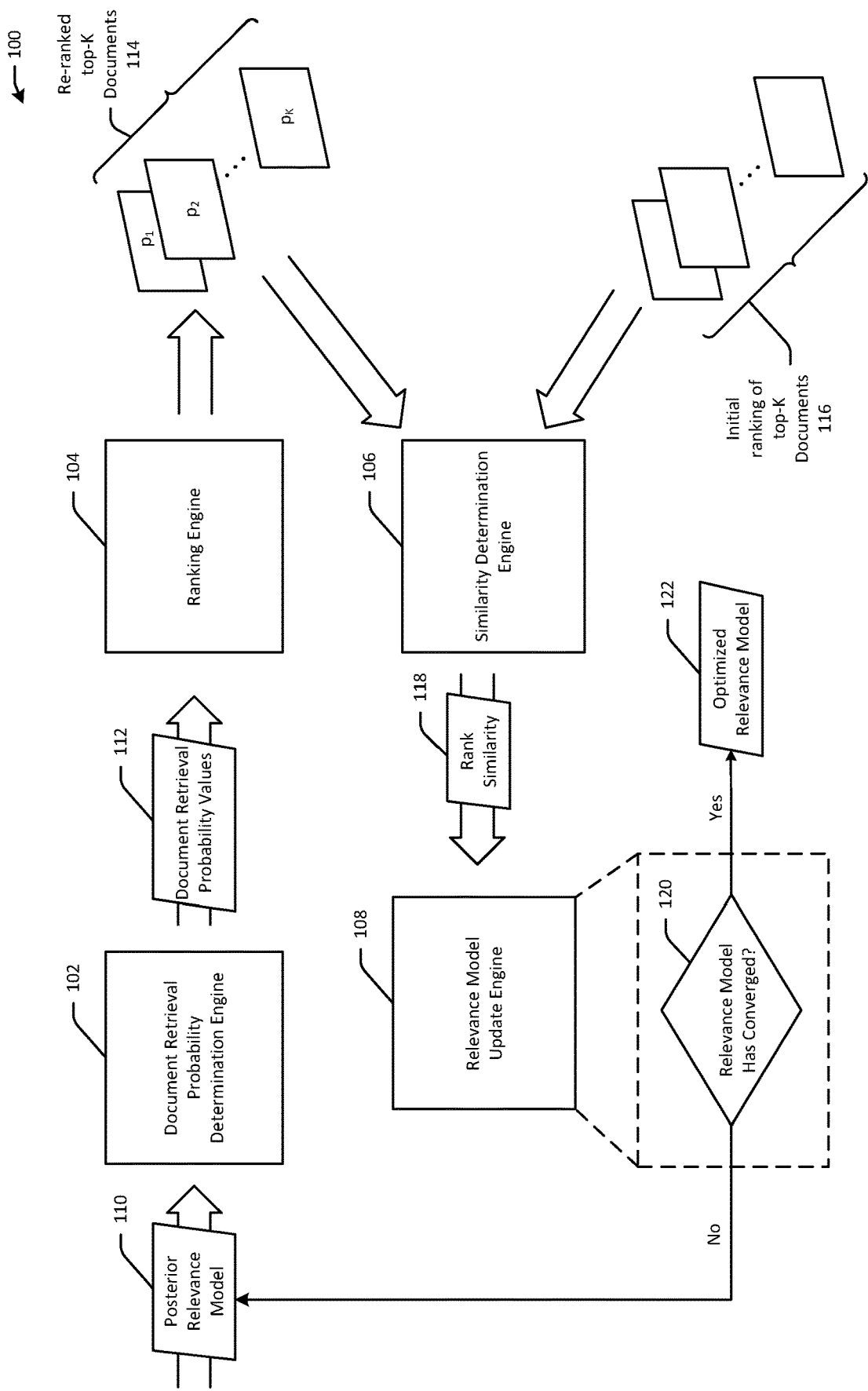
FIG. 1 schematically depicts illustrative operation of a PRF system in accordance with one or more example embodiments of the disclosure.

PRF feedback refers to various techniques that may be used to improve the relevance of search results returned for a search query (e.g., through query expansion, re-ranking, fusion, etc.) in the absence of explicit or implicit relevance feedback. A number of PRF feedback techniques have been developed over the years. Most common among these are the Rocchio relevance model, relevance-based language models, and model-based feedback. Other known PRF techniques are generally based on these common PRF techniques and suggest various enhancements such as, for example, bootstrap sampling of feedback documents, usage of a cluster language model (LM) for improved smoothing, utilizing additional lists of feedback documents, and so forth.

The Rocchio relevance model is an early relevance model in which a query is modified to include more of those terms that appear in feedback documents (e.g., the top-K documents retrieved for the query). Relevance-based language models are expansion-based (e.g., modifying the query by adding additional terms) PRF models that attempt to estimate relevance by assuming that the query and the top-K relevant documents both relate to the same relevance generative model. The most commonly used relevance-based language model is the RM3 relevance model that combines query anchoring with the RM1 relevance model. The RM1 model may be formally defined as: $P(w, q_1, \ldots, q_k) \Sigma_{M \in \mathcal{M}} P(M) P(w|M) \Pi_{i=1}^{k} P(q_i|M)$. Query anchoring may be formally defined as: $\theta_{Q'} = (1-\alpha)\theta_Q + \alpha\theta_F$, where Q' represents a modified query, Q represents the original query, and F represents the feedback. The smaller the value of $\alpha$, the more similar the modified query is to the original query.

The third most common type of PRF technique is model-based feedback. An example LM that may be used for PRF is the Kullback-Leibler (KL) divergence LM. Two approaches have been suggested for use of the KL divergence LM in connection with PRF. The first approach, known as the generative model of feedback documents—is based on the assumption that each feedback document comes from a mixture of relevant and non-relevant models. This mixed feedback model is learned using the expectation-maximization (EM) algorithm and anchored using query anchoring. The feedback documents are then re-scored using KL divergence. The second approach—known as divergence minimization over feedback documents—attempts to determine an optimal model from a collection model.

Conventional PRF techniques (such as any of those discussed above) suffer from various drawbacks, at least some of which are eliminated by a PRF system in accordance with example embodiments of the disclosure. A PRF system according to example embodiments of the disclosure may be configured to determine an optimized relevance model for a query by utilizing a posterior relevance model to estimate the likelihood that an initial set of top-K retrieved documents would be retrieved given the posterior relevance model, re-ranking the top-K documents based on their respective estimates of likelihood of retrieval, determining a rank similarity between the initial ranking of the top-K documents and the re-ranking of the top-K documents, updating one or more model parameters of the posterior relevance model based on the rank similarity, and iteratively performing the above process until the rank similarity is maximized, at which point, an optimized relevance model is obtained.

An example drawback of conventional PRF techniques that utilize query expansion is query drift. Query drift may occur when terms from feedback documents that are unrelated to the query topic are added to the query. As previously described, conventional PRF techniques utilize query anchoring to mitigate query drift. A PRF system in accordance with example embodiments of the disclosure, however, avoids query drift without having to utilize query anchoring by ensuring that the optimized relevance model results in the same ranking of the feedback documents (e.g., the initial top-K documents retrieved for the query) as the initial ranking of the feedback documents. Although, a PRF system in accordance with example embodiments of the disclosures does not require query anchoring to avoid or mitigate query drift, the PRF system 100 may nonetheless use query anchoring as well.

Another example drawback of certain conventional PRF techniques is the assumption that is made that the document relevance priors of the feedback documents are all uniform. As a result, such conventional PRF techniques ignore the document relevance priors when ranking the feedback documents. A document relevance prior may be a measure of the probability that a document is relevant to any query, not just the particular query that returned the feedback documents. For example, conventional PRF techniques may score documents according to their query likelihood. The probability of retrieval of a particular document for a given query may be proportional to the query likelihood score of the document multiplied by the document relevance prior of the document. A PRF system in accordance with example embodiments of the disclosure, however, does not make such an assumption regarding uniformity of the document relevance priors of the feedback documents, and instead, directly calculates the document relevance priors.

Yet another example drawback of conventional PRF techniques is that they do not attempt to reconstruct the initial ranking of the set of feedback documents, and thus, do not account for the feedback inherent in the initial ranking. A PRF system in accordance with example embodiments of the disclosure, however, optimizes the relevance model based on a reconstruction of the initial ranking, and thus, incorporates the feedback inherent in the initial ranking.

Illustrative PRF System and Processes

Figure 2:
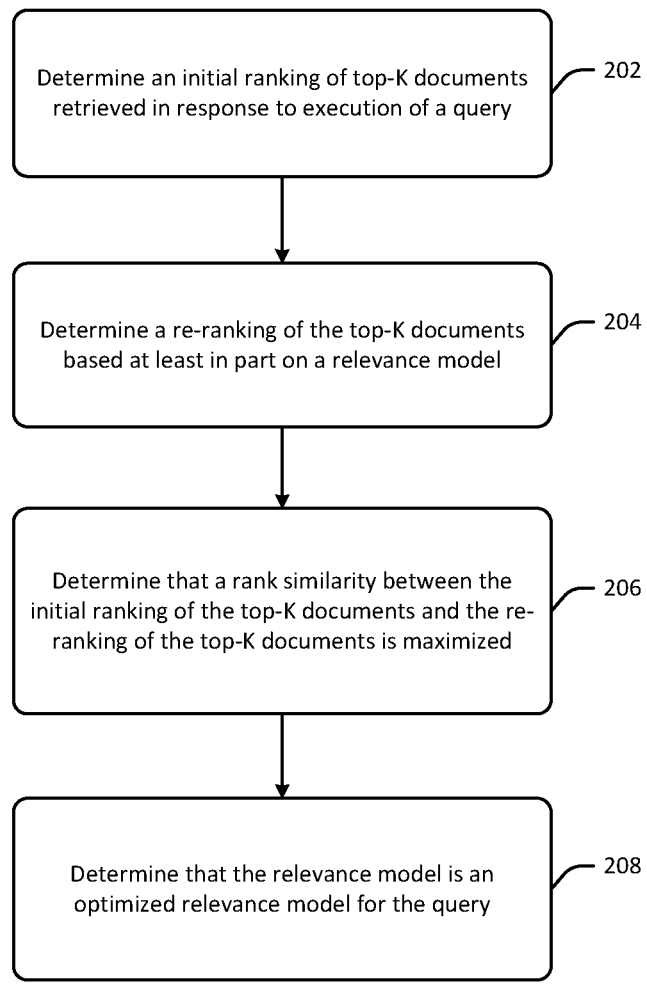
FIG. 2 is a process flow diagram of an illustrative method for determining an optimized relevance model for a search query in accordance with one or more example embodiments of the disclosure.
Figure 3:
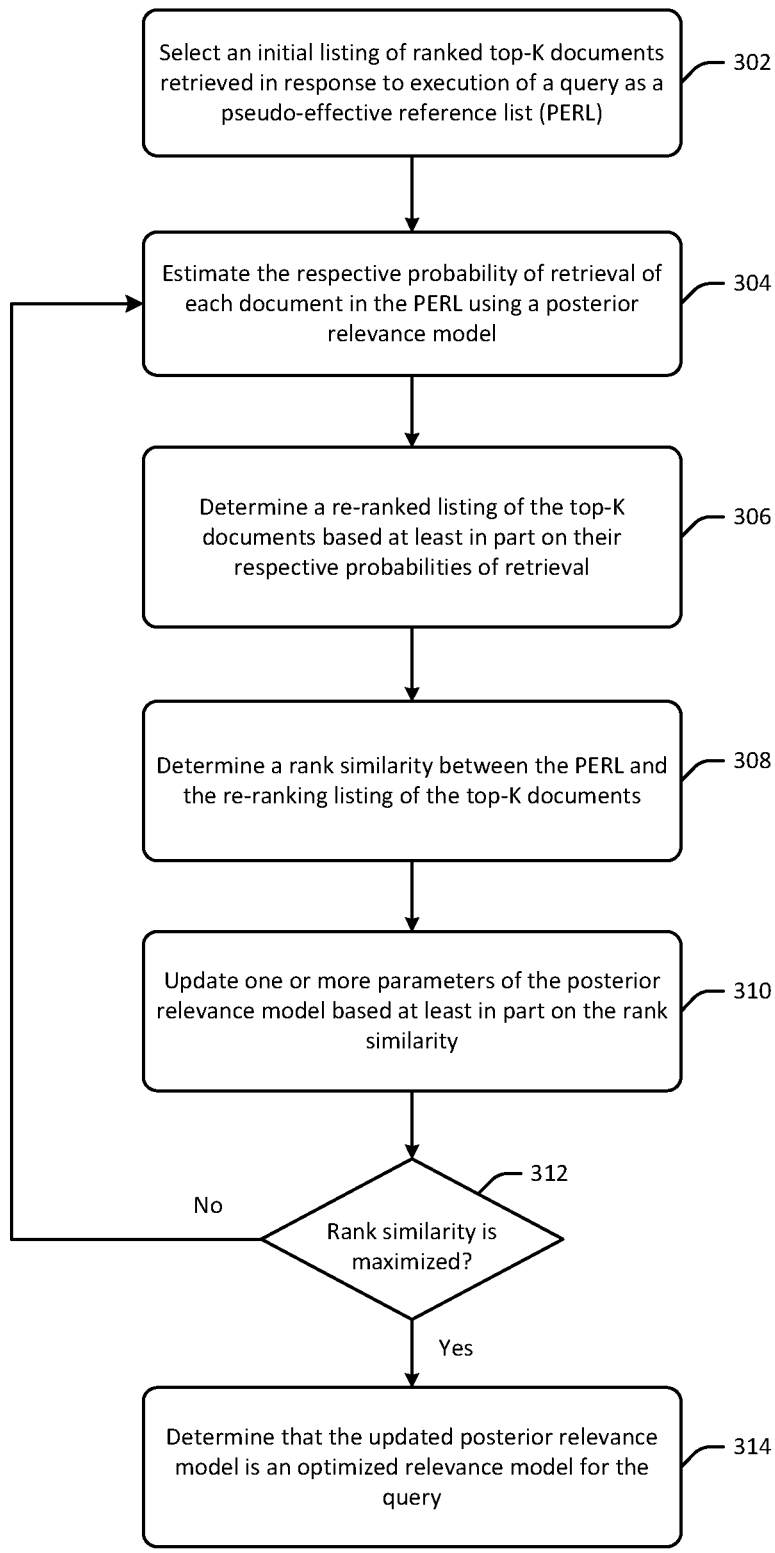
FIG. 3 is a process flow diagram of a more detailed illustrative method for determining an optimized relevance model for a query in accordance with one or more example embodiments of the disclosure.

FIG. 1 schematically depicts illustrative operation of a PRF system 100 in accordance with one or more example embodiments of the disclosure. FIG. 2 is a process flow diagram of an illustrative method 200 for determining an optimized relevance model for a search query in accordance with one or more example embodiments of the disclosure. FIG. 3 is a process flow diagram of a more detailed illustrative method 300 for determining an optimized relevance model for a query in accordance with one or more example embodiments of the disclosure. FIG. 1 will be described hereinafter in conjunction with FIGS. 2 and 3.

Referring first to FIG. 1, a PRF system 100 is depicted. The PRF system 100 may include various engines configured to perform various operations. For example, the PRF system 100 may include, without limitation, a document retrieval probability determination engine 102, a ranking engine 104, a similarity determination engine 106, and a relevance model update engine 108. Each engine of the PRF system 100 may include computer-executable instructions, code, or the like that responsive to execution by a processing circuit (e.g., one or more processing units) may cause one or more corresponding operations to be performed. In certain example embodiments, an engine may include one or more program. Each such module may include computer-executable instructions, code, or the like that responsive to execution by a processing circuit may cause a more specialized task or operation to be performed. It should be appreciated that, while not depicted in FIG. 1, any of the engines of the PRF system 100 may include any number of modules or sub-modules. Further, at times herein, the terms engine, module, or program module may be used interchangeably.

FIG. 1 depicts an example configuration and operation of the PRF system 100 according to which a posterior relevance model 110 is utilized to re-rank a set of search results, the re-ranking of the search results is compared to the initial ranking of the search results to determine a rank similarity, and one or more model parameters of the relevance model 110 are updated based on the rank similarity until the rank similarity is maximized (e.g., the re-ranking is as close as possible to the initial ranking) and an optimized relevance model 122 is obtained. The posterior relevance model 110 may be any suitable LM such as, for example, the multinomial distribution (or more specifically the categorical distribution).

More specifically, referring now to FIGS. 1 and 2 in conjunction with one another, at block 202 of method 200, the PRF system 100 may identify a set of top-K documents retrieved for a search query and determine an initial ranking 116 of the top-K documents. At block 204 of method 200, the PRF system 100 may determine a re-ranking 114 of the top-K documents based on the relevance model 110. At block 206 of method 200, the PRF system 100 may determine that a rank similarity between the initial ranking 116 and the re-ranking 114 is maximized. Based on the determination at block 206, the PRF system 100 may determine, at block 208 of method 200, that the current version of the relevance model 110 is an optimized relevance model 122 for the query.

The method 200 depicted in FIG. 2 illustrates a final iteration of an iterative optimization process that may include any number of iterations. As part of each iteration, the relevance model 110 may be updated based on the rank similarity between the re-ranking 116 of the top-K documents that is determined during that iteration and the initial ranking of the top-K documents. Updating the relevance model 110 may include updating one or more model parameters of the relevance model 110. As such, a current iteration of the optimization process performed by the PRF system 100 may utilize the updated relevance model 110 from a previous iteration to determine the re-ranking 116 of the top-K documents for the current iteration. The iterative optimization process may continue until the rank similarity is maximized, at which point, the most recent version of the relevance model 110 may be selected as to the optimized relevance model 122. The optimized relevance model 122 may be the relevance model 110 that was updated during the iteration prior to the iteration during which the rank similarity is maximized. Alternatively, the relevance model 110 may be updated based on the maximized rank similarity and this updated relevance model may be selected as the optimized relevance model 122.

The PRF system 100 may perform the above-described optimization process iteratively until the optimized relevance model 122 is determined. In certain example embodiments, the optimized relevance model 122 may be a solution to an optimization problem that may be mathematically modeled as follows. Let q denote a search query that includes one or more search terms, D denote an initial ranking of a set of top-K retrieved documents for q, and $\theta$ denote the optimized relevance model 122, then $\theta$=arg max sim (D, $D_\theta$), where sim (D, $D_\theta$) denotes the similarity between D (the initial ranking of the set of top-K documents) and $D_\theta$ (a new ranking of the top-K documents obtained by scoring the top-K documents based on a posterior relevance model $p(d|\theta)$ (e.g., the relevance model 110). A suitable stochastic optimization algorithm may be used to solve the above-described optimization problem to obtain the optimized relevance model $\theta$ (e.g., the optimized relevance model 122).

The method 300 depicted in FIG. 3 illustrates the iterative optimization process in more detail. Referring now to FIGS. 1 and 3 in conjunction with one another, as an initial starting point, at block 302 of method 300, a set of top-K documents may be selected from search results returned for a search query. The term document and search result may, at times, be used interchangeably herein. The set of top-K documents may be ranked in accordance with an initial ranking 116. The list of top-K documents having the initial ranking 116 may be referred to hereinafter as a pseudo effective reference list (PERL). For example, in an initial iteration of the iterative process performed by the PRF system 100, an initial version of the relevance model 110 may be sampled to obtain the PERL.

The relevance model 110 may then be provided as input to the document retrieval probability determination engine 102. Computer-executable instructions, code, or the like of the document retrieval probability determination engine 102 may be executed by a processing circuit to cause operations to be performed to determine a set of document retrieval probability values 112, where each document retrieval probability value is an estimate of the respective probability of retrieval of a corresponding document in the PERL based on the relevance model 110. More specifically, the relevance model 110 (which may be modeled as $p(.|q)$) may be used to estimate the likelihood $p(d|q)$ of each d in the PERL. This may be mathematically modeled as $p(d|\theta)=\Pi_{w \in d} p(w|\theta)^{c(w,d)}$, where c(w, d) is the frequency of term w in d. Thus, the probability of document d being retrieved in response to the query q (e.g., $p(d|q)$) may be based on a respective probability of occurrence of each term w in d as well as a respective frequency of occurrence of each term w.

The set of document retrieval probability values 112 may be provided as input to the ranking engine 104. At block 306 of method 300, computer-executable instructions, code, or the like of the ranking engine 104 may be executed to rank the top-K documents according to the set of document retrieval probability values 112 (e.g., the $p(d|q)$ for each document in the PERL) in accordance with a probabilistic ranking principle (PRP). As a result, the ranking engine 104 may generate, at block 306, a re-ranking 114 of the top-K documents in accordance with their respective probabilities of retrieval given the relevance model 110.

At block 308, computer-executable instructions, code, or the like of the similarity determination engine 106 may be executed to determine a rank similarity 118 between the initial ranking 116 of the top-K documents (e.g., the PERL) and the re-ranked listing 114 of the top-K documents. The rank similarity 118 may be any suitable metric for determining the degree of similarity between two permutations (the initial ranked list 116 of the top-K documents and the re-ranked list 114 of the top-K documents may each be viewed as permutations). For example, in certain example embodiments, Kendall-Tau similarity may be used to determine the rank similarity 118. The rank similarity 118 may optionally be normalized to a value between 0 and 1.

The rank similarity 118 may be provided as input to the relevance model update engine 108. At block 310 of method 300, computer-executable instructions, code, or the like of the relevance model update engine 108 may be executed by a processing circuit to cause operations to be performed to update one or more model parameters of the relevance model 110 based on the rank similarity 118. A stochastic optimization algorithm may be employed to learn the model parameters over time using the respective rank similarity 118 determined during each iteration of the optimization process. It should be appreciated that different model parameter(s) may be updated during different iterations.

At block 312 of method 300, computer-executable instructions, code, or the like of the relevance model update engine 108 may be executed by a processing circuit to cause operations to be performed to determine whether the rank similarity 118 is maximized. That is, the relevance model update engine 108 may determine whether the ranking of the re-ranked list 114 of the top-K documents is as close as can be achieved to the initial ranking 116 of the top-K documents (e.g., the PERL). Thus, the determination at block 312 is equivalent to the determination at block 120 in FIG. 1 as to whether the relevance model 110 has converged to the optimized relevance model 122, or in other words, whether a solution to the optimization problem mathematically formulated above has been obtained.

In response to a positive determination at block 312 (equivalent to a positive determination at block 120 in FIG. 1), the updated relevance model 110 from the current iteration may be determined to be the optimized relevance model 122, as shown at block 314. On the other hand, in response to a negative determination at block 312, the method 300 may return to block 304 to begin a new iteration of the optimization process where the updated relevance model 110 from the previous iteration is used to again determine respective probabilities of retrieval of the top-K documents and re-rank to the top-K documents.

Example embodiments of the disclosure include or yield various technical features, technical effects, and/or improvements to technology. Example embodiments of the disclosure provide a PRF system configured to perform an unsupervised optimization process to determine an optimized relevance model by utilizing a posterior relevance model to estimate the likelihood that an initial set of top-K retrieved documents would be retrieved given the posterior relevance model, re-ranking the top-K documents based on their respective estimates of likelihood of retrieval, determining a rank similarity between the initial ranking of the top-K documents and the re-ranking of the top-K documents, updating one or more model parameters of the posterior relevance model based on the rank similarity, and iteratively performing the above process until the rank similarity is maximized, at which point, an optimized relevance model is obtained. These aspects of the disclosure constitute technical features that yield the technical effect of determining an optimized relevance model via a process that avoids query drift without requiring query anchoring, the technical effect of taking into account document relevance priors (and not assuming, as conventional PRF techniques do, that document relevance priors are uniform), and the technical effect of utilizing the feedback inherent in the initial ranking of the top-K documents by attempting to reconstruct a re-ranked listing of the top-K documents that matches the initial ranking. As a result of these technical features and technical effects, a PRF system in accordance with example embodiments of the disclosure represents an improvement to existing PRF techniques. It should be appreciated that the above examples of technical features, technical effects, and improvements to technology of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure.

Illustrative Networked Architecture

Figure 4:
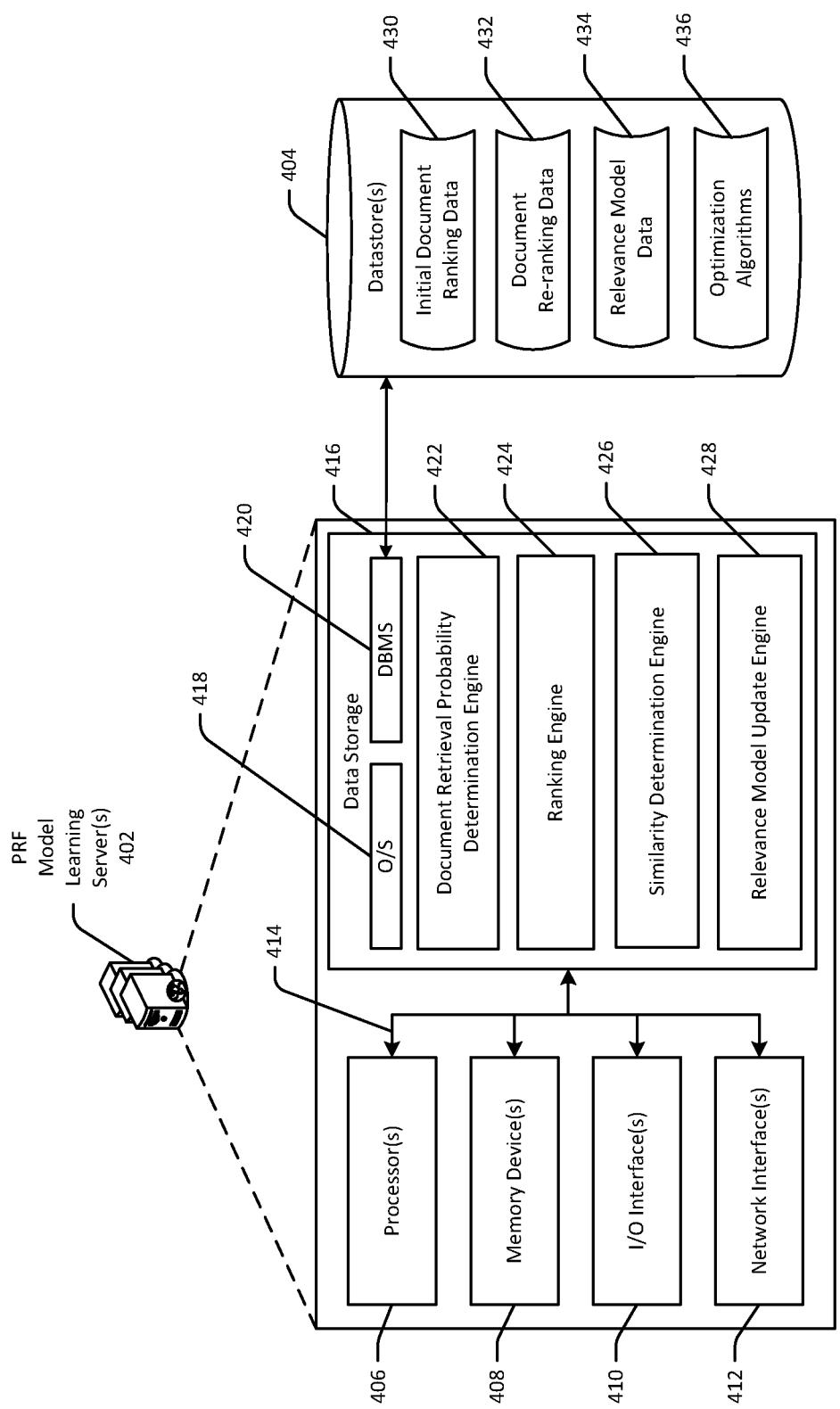
FIG. 4 is a schematic diagram of an illustrative configuration of a PRF model learning server in accordance with one or more example embodiments of the disclosure.

FIG. 4 is a schematic diagram of an illustrative PRF model learning server 402 (referred to hereinafter as PRF server 402) in accordance with one or more example embodiments of the disclosure. While the PRF server 402 may be described herein in the singular, it should be appreciated that multiple instances of the PRF server 402 may be provided, and functionality described in connection with the PRF server 402 may be distributed across such multiple instances.

In an illustrative configuration, the PRF server 402 may include one or more processors (processor(s)) 406, one or more memory devices 408 (generically referred to herein as memory 408), one or more input/output ("I/O") interface(s) 410, one or more network interfaces 412, and data storage 416. The may further include one or more buses 414 that functionally couple various components of the PRF server 402.

The bus(es) 414 may include at least one of a system bus, a memory bus, an address bus, or a message bus, and may permit exchange of information (e.g., data (including computer-executable code), signaling, etc.) between various components of the PRF server 402. The bus(es) 414 may include, without limitation, a memory bus or a memory controller, a peripheral bus, an accelerated graphics port, and so forth. The bus(es) 414 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 408 of the PRF server 402 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 408 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 408 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 416 may include removable storage and/or non-removable storage including, but not limited to, magnetic storage, optical disk storage, and/or tape storage. The data storage 416 may provide non-volatile storage of computer-executable instructions and other data. The memory 408 and the data storage 416, removable and/or non-removable, are examples of computer-readable storage media (CRSM) as that term is used herein.

The data storage 416 may store computer-executable code, instructions, or the like that may be loadable into the memory 408 and executable by the processor(s) 406 to cause the processor(s) 406 to perform or initiate various operations. The data storage 416 may additionally store data that may be copied to memory 408 for use by the processor(s) 406 during the execution of the computer-executable instructions. Moreover, output data generated as a result of execution of the computer-executable instructions by the processor(s) 406 may be stored initially in memory 408, and may ultimately be copied to data storage 416 for non-volatile storage.

More specifically, the data storage 416 may store one or more operating systems (O/S) 418; one or more database management systems (DBMS) 420 configured to access the memory 408 and/or one or more datastores 404; and one or more program modules, applications, engines, computer-executable code, scripts, or the like such as, for example, a document retrieval probability determination engine 422, a ranking engine 424, a similarity determination engine 426, and a relevance model update engine 428. One or more engines of the PRF server 402 may include one or more program modules (not shown) configured to be executed to perform more specialized tasks. Any of the components depicted as being stored in data storage 416 may include any combination of software, firmware, and/or hardware. The software and/or firmware may include computer-executable code, instructions, or the like that may be loaded into the memory 408 for execution by one or more of the processor(s) 406 to perform any of the operations described earlier in connection with correspondingly named engines or modules.

Although not depicted in FIG. 4, the data storage 416 may further store various types of data utilized by components of the PRF server 402 (e.g., any of the data depicted as being stored in the datastore(s) 404). Any data stored in the data storage 416 may be loaded into the memory 408 for use by the processor(s) 406 in executing computer-executable code. In addition, any data depicted as being stored in the data storage 416 may potentially be stored in one or more of the datastore(s) 404 and may be accessed via the DBMS 420 and loaded in the memory 408 for use by the processor(s) 406 in executing computer-executable instructions, code, or the like.

The processor(s) 406 may be configured to access the memory 408 and execute computer-executable instructions loaded therein. For example, the processor(s) 406 may be configured to execute computer-executable instructions of the various program modules, applications, engines, or the like of the PRF server 402 to cause or facilitate various operations to be performed in accordance with one or more embodiments of the disclosure. The processor(s) 406 may include any suitable processing unit capable of accepting data as input, processing the input data in accordance with stored computer-executable instructions, and generating output data. The processor(s) 406 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 406 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 406 may be capable of supporting any of a variety of instruction sets.

Referring now to other illustrative components depicted as being stored in the data storage 416, the 0/S 418 may be loaded from the data storage 416 into the memory 408 and may provide an interface between other application software executing on the PRF server 402 and hardware resources of the PRF server 402. More specifically, the 0/S 418 may include a set of computer-executable instructions for managing hardware resources of the PRF server 402 and for providing common services to other application programs (e.g., managing memory allocation among various application programs). In certain example embodiments, the 0/S 418 may control execution of one or more of the program modules depicted as being stored in the data storage 416. The O/S 418 may include any operating system now known or which may be developed in the future including, but not limited to, any server operating system, any mainframe operating system, or any other proprietary or non-proprietary operating system.

The DBMS 420 may be loaded into the memory 408 and may support functionality for accessing, retrieving, storing, and/or manipulating data stored in the memory 408, data stored in the data storage 416, and/or data stored in the datastore(s) 404. The DBMS 420 may use any of a variety of database models (e.g., relational model, object model, etc.) and may support any of a variety of query languages. The DBMS 420 may access data represented in one or more data schemas and stored in any suitable data repository.

The datastore(s) 404 may include, but are not limited to, databases (e.g., relational, object-oriented, etc.), file systems, flat files, distributed datastores in which data is stored on more than one node of a computer network, peer-to-peer network datastores, or the like. The datastore(s) 404 may store various types of data including, without limitation, initial document ranking data 430 (e.g., data that identifies a set of top-K documents and an initial ranking of the top-K documents); document re-ranking data 432 (e.g., data that identifies one or more re-ranked listings of the top-K documents as determined during one or more iterations of the optimization process); relevance model data 434 (e.g., data that indicates one or more model parameters of a relevance model, data associated with an optimized relevance model, etc.); and optimization algorithms 436 (e.g., data that defines an optimization problem to be solved and one or more optimization algorithms, such as a stochastic optimization algorithm, that can be used to solve the optimization problem). It should be appreciated that, in certain example embodiments, any of the datastore(s) 404 and/or any of the data depicted as residing thereon may additionally, or alternatively, be stored locally in the data storage 416.

Referring now to other illustrative components of the PRF server 402, the input/output (I/O) interface(s) 410 may facilitate the receipt of input information by the PRF server 402 from one or more I/O devices as well as the output of information from the PRF server 402 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the PRF server 402 or may be separate. The I/O devices may further include, for example, any number of peripheral devices such as data storage devices, printing devices, and so forth.

The I/O interface(s) 410 may also include an interface for an external peripheral device connection such as universal serial bus (USB), FireWire, Thunderbolt, Ethernet port or other connection protocol that may connect to one or more networks. The I/O interface(s) 410 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The PRF server 402 may further include one or more network interfaces 412 via which the PRF server 402 may communicate with any of a variety of other systems, platforms, networks, devices, and so forth. The network interface(s) 412 may enable communication, for example, with one or more other devices via one or more networks which may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the engines/modules depicted in FIG. 4 as being stored in the data storage 416 (or depicted in FIG. 1 more generally as part of the PRF system 100) are merely illustrative and not exhaustive and that processing described as being supported by any particular engine or module may alternatively be distributed across multiple engines, modules, or the like, or performed by a different engine, module, or the like. In addition, various program module(s), script(s), plug-in(s), Application Programming Interface(s) (API(s)), or any other suitable computer-executable code hosted locally on the PRF server 402 and/or hosted on other computing device(s) accessible via one or more of networks, may be provided to support functionality provided by the engines/modules depicted in FIGS. 1 and 4 and/or additional or alternate functionality. Further, functionality may be modularized differently such that processing described as being supported collectively by the collection of engines/modules depicted in FIGS. 1 and 4 may be performed by a fewer or greater number of engines or program modules, or functionality described as being supported by any particular engine or module may be supported, at least in part, by another engine or program module. In addition, engines or program modules that support the functionality described herein may form part of one or more applications executable across any number of devices of the PRF server 402 in accordance with any suitable computing model such as, for example, a client-server model, a peer-to-peer model, and so forth. In addition, any of the functionality described as being supported by any of the engines/modules depicted in FIGS. 1 and 4 may be implemented, at least partially, in hardware and/or firmware across any number of devices.

It should further be appreciated that the PRF server 402 may include alternate and/or additional hardware, software, or firmware components beyond those described or depicted without departing from the scope of the disclosure. More particularly, it should be appreciated that software, firmware, or hardware components depicted as forming part of the PRF server 402 are merely illustrative and that some components may not be present or additional components may be provided in various embodiments. While various illustrative engines/modules have been depicted and described as software engines or program modules stored in data storage 416, it should be appreciated that functionality described as being supported by the engines or modules may be enabled by any combination of hardware, software, and/or firmware. It should further be appreciated that each of the above-mentioned engines or modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular engine or module may, in various embodiments, be provided at least in part by one or more other engines or modules. Further, one or more depicted engines or modules may not be present in certain embodiments, while in other embodiments, additional engines or modules not depicted may be present and may support at least a portion of the described functionality and/or additional functionality. Moreover, while certain engines modules may be depicted or described as sub-engines or sub-modules of another engine or module, in certain embodiments, such engines or modules may be provided as independent engines or modules or as sub-engines or sub-modules of other engines or modules.

One or more operations of the methods 200 or 300 may be performed by a PRF system 100 that includes one or more PRF servers 402 having the illustrative configuration depicted in FIG. 4, or more specifically, by one or more engines, program modules, applications, or the like executable on such device(s). It should be appreciated, however, that such operations may be implemented in connection with numerous other system configurations.

The operations described and depicted in the illustrative methods of FIGS. 2 and 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2 and 3 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for enhancing robustness of pseudo-relevance feedback models using query drift minimization, the method comprising:
    determining, by a computer processor, a first set of search results returned for a search query, wherein the first set of search results is ranked in accordance with a first ranking;
    determining, by the computer processor, a first relevance model;
    determining, by the computer processor and based at least in part on the first relevance model, a respective probability of retrieval of each search result in the first set of search results;
    determining, by the computer processor, a second ranking for the first set of search results based at least in part on the respective probability of retrieval of each result in the set of search results;
    determining, by the computer processor, a rank similarity between the first ranking and the second ranking;
    determining, by the computer processor, a second relevance model by updating at least one model parameter of the first relevance model based at least in part on the rank similarity;
    determining, by the computer processor, that the second relevance model is an optimized relevance model for the search query; and
    determining, by the computer processor, a second set of search results for the search query using the second relevance model, wherein the first set of search results and the second set of search results comprise a set of common search results, and wherein determining the second set of search results using the second relevance model causes a rank similarity between a ranking of the set of common search results in the first set of search results and a ranking of the set of common search results in the second set of search results to be maximized and query drift to be minimized without performing query anchoring of the search query.

2. The method of claim 1, wherein determining that the second relevance model is an optimized relevance model for the search query comprises determining that the rank similarity is maximized.

3. The method of claim 2, wherein determining that the rank similarity is maximized comprises determining that the first ranking is equivalent to the second ranking.

4. The method of claim 1, wherein the respective probability of retrieval is a first respective probability of retrieval, the rank similarity is a first rank similarity, and the at least one model parameter is a first at least one model parameter, the method further comprising prior to determining the first relevance model:
    determining, by the computer processor, a third relevance model;
    determining, by the computer processor and based at least in part on the third relevance model, a second respective probability of retrieval of each search result in the set of search results;
    determining, by the computer processor, a third ranking for the set of search results based at least in part on the second respective probability of retrieval of each result in the set of search results;
    determining, by the computer processor, a second rank similarity between the first ranking and the third ranking; and
    determining, by the computer processor, the first relevance model by updating a second at least one model parameter of the third relevance model based at least in part on the second rank similarity.

5. The method of claim 1, wherein the respective probability of retrieval is a first respective probability of retrieval, the rank similarity is a first rank similarity, and the at least one model parameter is a first at least one model parameter, the method further comprising subsequent to determining the second relevance model:
    determining, by the computer processor and based at least in part on the second relevance model, a second respective probability of retrieval of each search result in the set of search results;
    determining, by the computer processor, a third ranking for the set of search results based at least in part on the second respective probability of retrieval of each result in the set of search results;
    determining, by the computer processor, a second rank similarity between the first ranking and the third ranking; and
    determining, by the computer processor, that the second rank similarity does not exceed the first rank similarity.

6. The method of claim 1, wherein determining the respective probability of retrieval of each search result in the set of search results comprises determining the respective probability of retrieval of a first result in the set of search results, and wherein determining the respective probability of retrieval of the first result comprises:
    determining, by the computer processor, a set of terms in the first search result; and
    determining, by the computer processor, a respective frequency of occurrence of each term in the set of terms;
    determining, by the computer processor and based at least in part on the first relevance model, a respective probability of retrieval of each term in the set of terms; and
    determining, by the computer processor, the respective probability of retrieval of the first result based at least in part on the respective frequency of each term in the set of terms and the respective probability of retrieval of each term in the set of terms.

7. A system for enhancing robustness of pseudo-relevance feedback models using query drift minimization, the system comprising:
    at least one memory storing computer-executable instructions; and
    at least one processor configured to access the at least one memory and execute the computer-executable instructions to:

determine a set of search results returned for a search query, wherein the set of search results is ranked in accordance with a first ranking;
determine a first relevance model;
determine, based at least in part on the first relevance model, a respective probability of retrieval of each search result in the set of search results;
determine a second ranking for the set of search results based at least in part on the respective probability of retrieval of each result in the set of search results;
determine rank similarity between the first ranking and the second ranking;
determine a second relevance model by updating at least one model parameter of the first relevance model based at least in part on the rank similarity;
determine that the second relevance model is an optimized relevance model for the search query; and
determine a second set of search results for the search query using the second relevance model, wherein the first set of search results and the second set of search results comprise a set of common search results, and wherein determining the second set of search results using the second relevance model causes a rank similarity between a ranking of the set of common search results in the first set of search results and a ranking of the set of common search results in the second set of search results to be maximized and query drift to be minimized without performing query anchoring of the search query.

8. The system of claim 7, wherein the at least one processor is configured to determine that the second relevance model is an optimized relevance model for the search query by executing the computer-executable instructions to determine that the rank similarity is maximized.

9. The system of claim 8, wherein at least one processor is configured to determine that the rank similarity is maximized by executing the computer-executable instructions to determine that the first ranking is equivalent to the second ranking.

10. The system of claim 7, wherein the respective probability of retrieval is a first respective probability of retrieval, the rank similarity is a first rank similarity, and the at least one model parameter is a first at least one model parameter, and wherein, prior to determining the first relevance model, the at least one processor is further configured to execute the computer-executable instructions to:
determine third relevance model;
determine, based at least in part on the third relevance model, a second respective probability of retrieval of each search result in the set of search results;
determine a third ranking for the set of search results based at least in part on the second respective probability of retrieval of each result in the set of search results;
determine a second rank similarity between the first ranking and the third ranking; and
determine the first relevance model by updating a second at least one model parameter of the third relevance model based at least in part on the second rank similarity.

11. The system of claim 7, wherein the respective probability of retrieval is a first respective probability of retrieval, the rank similarity is a first rank similarity, and the at least one model parameter is a first at least one model parameter, and wherein, subsequent to determining the second relevance model, the at least one processor is further configured to execute the computer-executable instructions to:
determine, based at least in part on the second relevance model, a second respective probability of retrieval of each search result in the set of search results;
determine a third ranking for the set of search results based at least in part on the second respective probability of retrieval of each result in the set of search results;
determine second rank similarity between the first ranking and the third ranking; and
determine that the second rank similarity does not exceed the first rank similarity.

12. The system of claim 7, wherein the at least one processor is configured to determine the respective probability of retrieval of each search result in the set of search results by executing the computer-executable instructions to determine the respective probability of retrieval of a first result in the set of search results, and wherein the at least one processor is configured to determine the respective probability of retrieval of the first result by executing the computer-executable instructions to:
determine a set of terms in the first search result; and
determine a respective frequency of occurrence of each term in the set of terms;
determine, and based at least in part on the first relevance model, a respective probability of retrieval of each term in the set of terms; and
determine the respective probability of the first result based at least in part on the respective frequency of each term in the set of terms and the respective probability of retrieval of each term in the set of terms.

13. A computer program product for enhancing robustness of pseudo-relevance feedback models using query drift minimization, the computer program product comprising a non-transitory storage medium readable by a processing circuit, the storage medium storing instructions executable by the processing circuit to cause a method to be performed, the method comprising:
determining a set of search results returned for a search query, wherein the set of search results is ranked in accordance with a first ranking;
determining a first relevance model;
determining, based at least in part on the first relevance model, a respective probability of retrieval of each search result in the set of search results;
determining a second ranking for the set of search results based at least in part on the respective probability of retrieval of each result in the set of search results;
determining a rank similarity between the first ranking and the second ranking;
determining a second relevance model by updating at least one model parameter of the first relevance model based at least in part on the rank similarity;
determining that the second relevance model is an optimized relevance model for the search query; and
determining a second set of search results for the search query using the second relevance model, wherein the first set of search results and the second set of search results comprise a set of common search results, and wherein determining the second set of search results using the second relevance model causes a rank similarity between a ranking of the set of common search results in the first set of search results and a ranking of the set of common search results in the second set of search results to be maximized and query drift to be minimized without performing query anchoring of the search query.

14. The computer program product of claim 13, wherein determining that the second relevance model is an optimized relevance model for the search query comprises determining that the rank similarity is maximized.

15. The computer program product of claim 14, wherein determining that the rank similarity is maximized comprises determining that the first ranking is equivalent to the second ranking.

16. The computer program product of claim 13, wherein the respective probability of retrieval is a first respective probability of retrieval, the rank similarity is a first rank similarity, and the at least one model parameter is a first at least one model parameter, the method further comprising prior to determining the first relevance model:
  determining a third relevance model;
  determining, based at least in part on the third relevance model, a second respective probability of retrieval of each search result in the set of search results;
  determining a third ranking for the set of search results based at least in part on the second respective probability of retrieval of each result in the set of search results;
  determining a second rank similarity between the first ranking and the third ranking; and
  determining the first relevance model by updating a second at least one model parameter of the third relevance model based at least in part on the second rank similarity.

17. The computer program product of claim 13, wherein the respective probability of retrieval is a first respective probability of retrieval, the rank similarity is a first rank similarity, and the at least one model parameter is a first at least one model parameter, the method further comprising subsequent to determining the second relevance model:
  determining, based at least in part on the second relevance model, a second respective probability of retrieval of each search result in the set of search results;
  determining a third ranking for the set of search results based at least in part on the second respective probability of retrieval of each result in the set of search results;
  determining a second rank similarity between the first ranking and the third ranking; and
  determining that the second rank similarity does not exceed the first rank similarity.

18. The computer program product of claim 13, wherein determining the respective probability of retrieval of each search result in the set of search results comprises determining the respective probability of retrieval of retrieval of a first result in the set of search results, and wherein determining the respective probability of the first result comprises:
  determining a set of terms in the first search result; and
  determining a respective frequency of occurrence of each term in the set of terms;
  determining, based at least in part on the first relevance model, a respective probability of retrieval of each term in the set of terms; and
  determining the respective probability of the first result based at least in part on the respective frequency of each term in the set of terms and the respective probability of retrieval of each term in the set of terms.

* * * * *